United States Patent
Hegelich et al.

(10) Patent No.: US 12,169,685 B2
(45) Date of Patent: Dec. 17, 2024

(54) COMPUTER-IMPLEMENTED METHOD OF PREPARING A TRAINING DATASET FOR A NATURAL LANGUAGE PROCESSING OR NATURAL LANGUAGE UNDERSTANDING MACHINE LEARNING ALGORITHM

(71) Applicants: Simon Hegelich, Munich (DE); Kolja Hegelich, Dorsten (DE)

(72) Inventors: Simon Hegelich, Munich (DE); Kolja Hegelich, Dorsten (DE)

( * ) Notice: Subject to any disclaimer, the term of this patent is extended or adjusted under 35 U.S.C. 154(b) by 504 days.

(21) Appl. No.: 17/450,795

(22) Filed: Oct. 13, 2021

(65) Prior Publication Data

US 2022/0358282 A1 Nov. 10, 2022

(30) Foreign Application Priority Data

May 5, 2021 (EP) ..................................... 21172292

(51) Int. Cl.
*G06F 40/166* (2020.01)
*G06F 40/247* (2020.01)
(Continued)

(52) U.S. Cl.
CPC .......... *G06F 40/166* (2020.01); *G06F 40/247* (2020.01); *G06F 40/253* (2020.01); *G06N 5/022* (2013.01)

(58) Field of Classification Search
CPC .... G06F 40/166; G06F 40/247; G06F 40/253; G06N 5/022
See application file for complete search history.

(56) References Cited

U.S. PATENT DOCUMENTS

2018/0246953 A1* 8/2018 Oh ....................... G06F 16/3329
2021/0124876 A1* 4/2021 Kryscinski ............ G06F 16/345
(Continued)

OTHER PUBLICATIONS

Alexey Tarasov, "Towards Reversal-Based Textual Data Augmentation for NLI Problems with Opposable Classes.", Jul. 10, 2020, In Proceedings of the First Workshop on Natural Language Interfaces, pp. 11-19, Online. Association for Computational Linguistics (Year: 2020).*

*Primary Examiner* — Eric Yen
(74) *Attorney, Agent, or Firm* — Schwegman Lundberg & Woessner, P.A.

(57) ABSTRACT

Described and claimed is a computer-implemented method of preparing a training dataset for a natural language processing, NLP, or natural language understanding, NLU, machine learning algorithm from an original text dataset, the method comprising the steps of selecting one or more sentences from the original text dataset as selected sentences, determining for each selected sentence one or more grammatical elements of the selected sentence that can be negated as negatable elements, determining for one or more negatable words in each negatable element one or more antonyms, based on each determined antonym creating a negated sentence by replacing the respective negatable element in the selected sentence for which the negatable element was determined with the determined antonym, and adding the negated sentences to the training dataset. Further, a computer-implemented method of training a word embedding or an NLP or NLU machine learning algorithm, a system and a computer program product are described and claimed.

20 Claims, 3 Drawing Sheets

(51) Int. Cl.
*G06F 40/253* (2020.01)
*G06N 5/022* (2023.01)

(56) References Cited

U.S. PATENT DOCUMENTS

2022/0004820 A1* 1/2022 Meron ..................... G06N 3/08
2022/0036180 A1* 2/2022 Archuleta ................ G06N 7/01

* cited by examiner

COMPUTER-IMPLEMENTED METHOD OF PREPARING A TRAINING DATASET FOR A NATURAL LANGUAGE PROCESSING OR NATURAL LANGUAGE UNDERSTANDING MACHINE LEARNING ALGORITHM

CROSS-REFERENCE TO RELATED APPLICATIONS

This Non-provisional application claims priority under 35 U.S.C. § 119(a) to European Patent Application No. 21172292.1, filed on 5 May 2021, the entire contents of which are hereby incorporated by reference in their entirety.

The present invention is directed to a computer-implemented method of preparing a training dataset for a natural language processing, NLP, or natural language understanding, NLU, machine learning algorithm from an original text dataset. The invention is further directed to a computer-implemented method of training a word embedding, using a word embedding in an NLP or NLU machine learning algorithm, a system comprising at least one processing unit and a memory and a computer program product.

In general, machine learning algorithms in NLP/NLU like deep learning, hidden Markov models, statistical learning etc. are used, to identify statistical patterns in text that can be used to calculate probabilities for different tasks. These tasks may include determining the most likely next word given a text fragment, determining the words are most likely to resemble a summary of a text, or calculating a probability that a given text is of a known class of texts. Statistical patterns used in these machine learning methods are often derived from so-called training datasets and identify patterns, for example, a frequency of a word in a training dataset, i.e., how often does a word occur in a training dataset, an order of words, i.e., which word follows which other word in a training dataset, or a position of words in a sentence in the training data set, e.g., a certain word is frequently the first word in a sentence or the fifth word. A machine learning algorithm will often rely on multiple statistical patterns such as combinations of the examples named above and additional statistics.

The accuracy of a machine learning method will therefore largely depend on the training datasets from which statistical patterns are derived. As the skilled person is aware, original text datasets which form the basis of the actual training datasets are frequently a poor representation of the complexity and variance of living languages. For example, most original text datasets will include a bias with the consequences that some contexts may be overrepresented, whereas other contexts will be underrepresented or missing entirely. Statistical patterns derived or learned from these original text datasets may miss, for example, associations humans would commonly infer or overestimate the importance of specific patterns.

In order to improve the quality of the NLU or NLP machine learning algorithm it is well-known in the art to increase the size of the training dataset. This may be done, for example, by combining multiple original text datasets in order to increase the variety of the contexts in which each word is found. However, in order to grasp the complexity of a living language many original text datasets have to be aggregated and analyzed. This takes up considerable computational resources and time which may not always be available.

In general, adding new text to the training dataset decreases the bias in the data but increases the variance. The relationship of bias and variance is known in the art as the bias-variance-trade-off. While a strong bias will lead to a misrepresentation and thereby might result in weak performance of machine learning models, strong variance will make it difficult and expansive to identify patterns: given the increased variance, the machine learning model might automatically focus on the most frequent patterns (known as reduce to the mean) or—depending on the algorithm—might fail to choose the right pattern out of the large number of training cases leading to random results. Given this trade-off between bias and variance the right balance can only be found for a specific problem and tools to fine-tune this balance are appreciated in the art.

In order to keep training datasets smaller and not having to aggregate original datasets from many data sources without knowing whether different contexts can be established from every additional dataset, it is well known in the art to use data augmentation to prepare a training dataset from an original dataset. Data augmentation is, for example, commonly used to prepare training datasets for machine learning algorithms for computer vision. A given image from an original image dataset can, for example, be altered by changing color values, resolution, cropping, mirroring or rotation to obtain additional images for a training dataset.

In the field of machine learning for NLP and NLU creating training datasets by data augmentation is challenging because the changing of a single word might change the whole context of the text which would result in the machine learning algorithm learning a useless or even misleading statistical pattern. Nevertheless, several data augmentation techniques have also been derived for preparing training datasets for NLP and NLU machine learning algorithms. It is known, for example, to create sentences for a training dataset from an original dataset, for example, by substituting or replacing a word in a sentence from the original text dataset with a synonym or hypernym. Substituting words with synonyms or hypernyms creates additional sentences with words that are expected to have the same meaning or describe a general class (e.g. canine as hypernym of dog). This enables a machine learning algorithm to determine statistical patterns or learn patterns based on the new sentences. Thereby, the number of different words represented in a training data set is increased. Further, a bias represented in an original text dataset towards a specific choice of words may be lessened without having to aggregate many original text datasets. This allows reducing the processing time and resources required for determining statistical patterns from the training datasets as overall smaller training datasets can be used.

By replacing a word with a synonym additional words may be added to training datasets but no additional contexts are created. Replacing words with hypernyms adds new words but makes the context less specific.

An NLP model that is learning "context" is relying on the frequencies and the distances of words in the training data. It is well known in the art to apply a moving window (e.g. of 7 words) to define context. Given that complex grammatical structures like sub-clauses may increase the distance of words that form a semantic context, this moving window approach has to face two important trade-offs: 1) A small moving window is not able to identify context of words separated by sup-clauses or other complex grammatical structures. But a broad moving window will tend to identify meaningless "contexts" between random words. 2) Increasing the moving window has a very negative effect on the calculation complexity (depending on the algorithm used it can lead to exponential growth of calculation time).

Given that a context is learned empirically from the training data, bias becomes an additional problem. In case the texts in the training data do not cover the whole variety of living languages—which is normally the case—, the patterns learned from these contexts will be a bad representation of the real world. Data augmentation by replacing words with their synonyms does not solve the problem, because synonyms per definition will recreate the same bias just with different words. Replacing words with hypernyms seems a better strategy to deal with bias, because hypernyms will reproduce the same context on a more abstract level. But due to the pure empirical definition of context in a machine learning setting, simply replacing words with hypernyms is in most cases insufficient, because the specific context of the sentences gets lost and the machine learning model will learn useless patterns. E.g. the sentence "The fox jumps over the dog.", would be transferred to "The canine moves over the canine", in case all hypernyms were substituted. This sentence is lacking any specific context and has now the same word as subject and object.

An additional problem in known methods of data augmentation is to find a strategy, which words to replace. The substitution of all words with their hypernyms or synonyms or even antonyms without an underlying strategy will create sentences that might be grammatical correct but are not commonly used in real texts. Therefore, a lot of computational resources are spent to learn patterns that will not appear in texts used for the final NLP-NLU-tasks. It is extremely problematic for modern techniques like word embeddings because this approach will lead to a misleading vector representation of the non-substituted words as well. (E.g. the model learns that the word "canine" appears often in the context of "canine" (which is redundant and would seldom appear in normal texts) and the word "move" shares a context with "canine".)

In a machine learning context, training data often consist of millions of sentences. Data augmentation is only useful in most settings if it can be applied fully automatic. But the existing data augmentation methods for NLP and NLU machine learning methods do not provide a smart strategy to automate the substitution of words. Common practices in the field are to substitute all possible words or to run this technique on a random set of sentences from the training data. The more words are substituted, the more the context is distorted. This approach therefore offers no smart solution for the bias-variance-trade-off.

In view of the above it can be considered an object of the present invention to provide an automatic method of preparing a training dataset that improves the variety of contexts present in a training dataset over an original text dataset without drastically increasing the computational and timing requirements for analyzing the training dataset.

The problem underlying the present invention is solved by a computer-implemented method for preparing a training dataset according to claim 1, a computer-implemented method of training a word embedding based on a training dataset according to claim 11, a method of using a word embedding according to claim 12, a system according to claim 13 and a computer program product according to claim 14. Preferred embodiments of the invention are described in the dependent claims.

In a first aspect the present invention is directed to a computer-implemented method of preparing a training dataset for a natural language processing, NLP, or natural language understanding, NLU, machine learning algorithm from an original text dataset. The method comprising the steps of selecting one or more sentences from the original text dataset as selected sentences, determining for each selected sentence one or more grammatical elements of the selected sentence that can be negated as negatable elements, determining for at least one negatable word in each negatable element one or more antonyms, based on each determined antonym creating a negated sentence by replacing the respective negatable word in the selected sentence for which the antonym was determined with the determined antonym, and adding the negated sentences to the training dataset.

In other words, the present invention is directed to a computer-implemented method in which an original text dataset is augmented to provide a training data set for an NLP or NLU machine learning algorithm. Machine learning algorithm refers, for example, to deep learning, hidden Markov models, statistical learning and others but expressly also includes the use of the training dataset for generating or improving word vector spaces or word embeddings such as, for example, GloVe or word2vec.

According to the method, one or more sentences are selected from an original text dataset. These sentences are referred to as selected sentences. The method according to the present invention may select all sentences of in the original text dataset or only a set chosen based on selected criteria. For example, a method may only select sentences which comprise at least a subject, an object and a predicate. In other word, sentences in the original text dataset which comprise, for example, only a subject and a predicate may be disregarded as processing of these sentences may be difficult in the current context. These sentences would not be selected.

Once a sentence has been selected, in an exemplary embodiment the selected sentence is pre-processed before any further processing. Pre-processing may include, for example, at least one of sentence tokenization, word tokenization, position of speech (POS-)tagging, noun-chunk parsing and dependency parsing, Sentence tokenization refers to the separation of individual sentences, word tokenization to the identification of individual words. In POS-tagging for each word the word group such as noun, adjective, preposition or verb is determined. Noun chunking refers to the identification of word groups that belong together, for example, an article, an adjective and a noun together forming an object of a sentence such as "the lazy dog" in the sentence "The quick brown fox jumped over the lazy dog." Other pre-processing steps may include automated spell-checking for typos and double characters or the removal of characters not defined in a character encoding scheme used in the method. Different pre-processing methods may be combined.

In the next method steps one or more grammatical elements are determined in each selected sentence. For example, in a preferred embodiment in each sentence at least one subject, an object and a predicate are determined. Thus, in the exemplary embodiment only grammatical elements forming a main clause of a selected sentence are selected and grammatical elements of a dependent clause may or may not be further considered. As will be explained in more detail below as part of a preferred embodiment, grammatical elements of dependent clauses may, for example, be used to create additional sentences, or combined to a new short sentence. For example, the sentence: "The police arrested the young man and took him to the new police office for further investigation.", would be transferred in the sentences "The police arrested the young man.", and "The police took him to the new police office.". The grammatical elements may, for example, be selected based on results of a pre-processing of selected sentences. Among the grammatical elements one or more negatable elements are selected, for which the method will in the next steps determine one or more antonyms in order to negate the selected sentence. For example, in one exemplary preferred embodiment discussed in more detail below, the method may select an object and a predicate of a selected sentence as negatable elements. In case the selection of negatable elements is performed on sentences which have already been pre-processed in a way that grammatical elements of the selected sentence have already been identified, it may be possible to complete this step by selecting the negatable elements from the already determined grammatical elements. In other words, a further processing of the selected sentences to determine the actual grammatical elements may not be necessary.

A grammatical element may be composed from a single word but may also include multiple words (noun-chunks). For example, an object may be formed from a preposition, an adjective and a noun and a predicate may include a verb and an adverb. Hence, each grammatical element and thus each negatable element may include one or more words.

Once the negatable elements have been determined, for one or more words in each negatable element one or more antonyms are determined. An antonym or opposite of a word is another word that is in a semantic relation in which one word has a sense or meaning opposite to the other word and, as such, negates it. Various kinds of antonyms exist. For example, graded or gradable antonyms are word pairs whose meanings are opposite and which lie on a continuous spectrum such as hot and cold. Complementary antonyms are word pairs whose meanings are opposite but whose meanings do not lie on a continuous spectrum like push and pull. Relational antonyms are word pairs where opposite makes sense only in the context of the relationship between the two meanings, e.g., teacher and pupil. Different ways of determining antonyms for a given negatable element are part of the preferred embodiments discussed below.

Furthermore, a negation can also be formed by adding a word indicating a negation like "not", in particular, for verbs. If the original sentence is already negated by a negating elements such as "not", "no" or "non", removing the negating element results in a negation of the original meaning of the sentence. However, it is preferred to negate negatable elements including verbs with antonyms, because it adds new words to the training data and thereby has a stronger effect.

With reference to the example sentence "The quick brown fox jumped over the lazy dog", the method may identify the object "over the lazy dog" as negatable element and then find, for example, "under" to be an antonym of the negatable word "over" and "active" or "energetic" to be antonyms of the negatable word "lazy."

In the next step, negated sentences are created or formed for each determined antonym by replacing the negatable words with their respective antonyms. For example, the method could form sentences such as "The quick brown fox jumped under the lazy dog", "The quick brown fox jumped over the active dog" or "The quick brown fox jumped over the energetic dog." In a final step the negated sentences are added to the training dataset.

The method according to the present invention can be implemented in various different ways. For example, the method could be implemented to select one sentence from an original text dataset and then perform all steps according to the method before the next sentence is selected from the original text dataset. Alternatively, it would be possible to process multiple sentences in parallel or complete one step for all selected sentences before proceeding to the next step. Also mixed implementations are possible as the skilled person will be aware.

The method according to the present invention advantageously provides a way of augmenting an existing original text dataset that does not amplify existing biases by adding synonyms or losing important context by adding hypernyms. Instead data augmentation with sentence negation as presented here can increase the quality of training datasets and, thereby, the machine learning methods trained on these training datasets by providing the possibility to learn meaningful patterns that are not present in the original text dataset. The disclosed methods thereby provide a first step to solve a general problem in contemporary artificial intelligence: for traditional machine learning systems it is not possible to learn anything that was not already in the data By data augmentation with sentence negation, it is possible to introduce a speculative element in the machine learning process.

Thus, the present method enables the creation of training datasets from original text datasets that avoid existing biases in the original text datasets by automatically generating negated sentences, i.e., sentences which include statements which have an opposite meaning as compared to the statements in the selected sentences. Since the negated sentences are purposefully created from the selected statements, the training dataset nevertheless remains relatively compact which keeps the required processing time and resources required for analyzing the training dataset to derive statistical patterns, i.e., train a machine learning algorithm, small compared to existing methods. As already indicated, the so-far only other way to reduce the bias in a dataset and increase the number of opposing statements is to aggregate a large number of original text datasets from different sources and essentially hope that some of the original text datasets include negated sentences as compared to the more common statements. As is well known, analyzing these large datasets will frequently take-up a considerable amount of time and computing resources. This can be avoided or at least reduced by purposefully including negated sentences into an original text dataset keeping the training dataset smaller and allowing to achieve the same or even more diverse results with less computing time and resources required for deriving statistical patterns from the training datasets.

In a preferred embodiment, the computer-implemented method further comprises the steps of creating additional negated sentences for at least one determined antonym by replacing the respective negatable word in the selected sentence for which the antonym was determined with the determined antonym and further replacing at least one other negatable word of this selected sentence with an antonym determined for the at least one other negatable word of this selected sentence, and adding the additional negated sentences to the training dataset.

Hence, in the preferred embodiment more than one negatable word is replaced in a selected sentence in order to create additional negated sentences for the training dataset. For example, in the previously discussed example an additional negated sentence could read "The quick brown fox jumped under the active dog." In the preferred embodiment additional new patterns are generated that would commonly not be present in original text datasets and the previously discussed advantageous effects are further increased.

Simply applying all possible substitutions may have the negative effect of increasing the number of sentences and thereby the calculation costs without increasing the variance proportionally because many of the new created sentences would be very similar. In addition, making too many substitutions in one sentence will increase the risk of losing important context information. The preferred embodiment of the invention therefore creates short sentences in a subject, predicate, object pattern from complex sentences and uses a smart strategy to determine the elements which to negate by focusing on predicates and objects that do appear in the short sentences and maybe limiting the number of substitutions and/or choosing only a subset of all possible sentences like only sentences with odd number of substitutions.

Given that the number of possible negated sentences is growing exponential with the number of antonyms that are suitable for replacement, it becomes clear that a smart strategy is needed to deal with the bias-variance-trade-off. The present method can be implemented with different strategies that deal with this trade-off In an exemplary preferred embodiment, the number of negatable elements is reduced by focusing on subject, predicate, object triples. For example, in a complex sentence like: "The police arrested the young man and took him to the new police office for further investigation.", the noun-chunk "for further investigation" may be ignored in the negation process, because it is not part of a subject-object-predicate-triple. Alternatively or additionally, the subjects in the identified triples are not negated as explained in more detail below. The idea behind this is that substituting the subject with an antonym may completely change the context and result in unrealistic sentences like "The criminal arrested the young man." Additionally or alternatively, the number of negated sentences may be reduced by replacing only a limited number of negatable words with their antonyms (e.g. only up to three antonyms are used) or to use only uneven numbers of antonyms because any even number would create a negation of a negation and might be close to the original sentence, Given that there is no general optimal solution for the bias-variance-trade-off, the right strategy has to be chosen in considering the actual problem and the given training data. In machine learning, the situation of having to adopt the general method to a specific problem is well known and methods with parameters for fine-tuning are considered more flexible and powerful.

Hence, preferably each additional negated sentence is formed from a selected sentence by replacing in total an uneven number of negatable words by antonyms in the selected sentence. This may at least in some cases be necessary in order to avoid double negations which could render a sentence meaningless or give its original meaning back.

It is further preferred that determining for each selected sentence one or more grammatical elements includes determining at least a subject, an object and a predicate of the selected sentence as grammatical elements of the selected sentence, wherein preferably at least one of the object and the predicate of the selected sentence are determined as a negatable element. As previously discussed, the object and predicate may be particularly useful grammatical elements to be used as negatable elements. On the other hand, it has been shown that negating the subject of a selected sentence may not be useful as this entirely changes the context of a sentence and could render meaningless sentences.

Further, the method preferably also includes forming for each selected sentence a shortened sentence by combining the subject, object and predicate previously determined for the selected sentence, wherein the shortened sentences are preferably added to the training dataset.

Generating shortened sentences may in the first place be used as a basis for negating sentences as the handling the shortened sentences requires less resources. Further, the shortened sentences may also be added to the training data set. Short sentences in a training dataset enable the machine learning method to more easily detect pattern of subject, object and predicate. As compared to the full sentences, less words have to be analyzed to obtain a context, i.e., the so-called context window can be reduced. This again reduces the computing resources and time required for analyzing the training data set in order to derive statistical patterns.

The preferred embodiment thus uses a smart strategy to determine the elements which to negate by focusing on predicates and objects that do appear in the short sentences and maybe limiting the number of substitutions and/or choosing only a subset of all possible sentences like only sentences with odd number of substitutions.

In an exemplary preferred embodiment, more than one short sentence is formed from a sentence, for example, in case the sentence includes one or more dependent phrases or conjunctions. The grammatical elements of the dependent phrases or the parts of the sentences separated by conjunctions may be combined to additional short sentences. For example, the sentence "The police arrested the young man and took him to the new police office for further investigation." could be shortened to the short sentences "The police arrested the young man.", and "The police took him to the new police office.".

The negated elements would then be determined based on these short sentences, Examples for negated short sentences are: "The police arrested the old man.", "The police freed the young man.", "The police did not arrest the young man.", "The police took him to the old police station", etc. These negated short sentences can be expanded to negations of the original sentence like "The police freed the young man and took him to the new police office for further investigation."

In a further preferred embodiment, the shortened sentence of a selected sentence is used as context for determining the antonyms of the negatable elements of the selected sentence. In order to select a meaningful antonym to a negatable element requires considering the context in which the antonym is used. For example, two antonyms of the word "lazy" are "diligent" and "active". In the context of cat jumping over a lazy dog, using the term "diligent" to form a negated sentence would result in meaningless sentence. However, from the context of the term "lazy", i.e., the dog being lazy, it can be derived that "active" would be an antonym which can be used to construct or create a meaningful negated sentence. By using only the shortened sentence as a context, computing time and resource can be reduced as compared to using the full sentence for determining antonyms from the same context.

In a further preferred embodiment, the shortened sentences are used as selected sentences for creating the negated sentences. In other words, the negated sentences are created by replacing the negatable elements in the originally selected sentences but rather in the short sentences. This has all the previously discussed advantages of reducing the time and computational resources required for analyzing the training dataset in order to derive statistical patterns as compared to operating on the full sentences while at the same time maintaining the essential context between subject, predicate and object.

In a preferred embodiment additional negated sentences are created for each selected sentence by taking the difference between a selected sentence and the shortened sentence formed for the selected sentence and adding this difference to the negated sentence created when using the shortened sentence for creating additional negated sentences. In other words, when the shortened sentences are created from the original selected sentences the words that are not carried over into the shortened sentence are not discarded but stored. Once a shortened sentence has been negated the original full context may be restored by adding the previously removed parts of the sentence. This allows to reduce complexity in processing when antonyms are selected but allows to consider the negated sentences in their full context when analyzing the training dataset to identify statistical patterns and train the machine learning algorithm. It should be noted that in a preferred embodiment both the shortened negated sentences and the restored full negated sentences are added to the training dataset to further augment the training dataset.

It is further preferred to include the original text dataset into the training dataset. Preferably, the training data set includes for each negated sentence a reference to the respective selected sentence from which the negated sentence was created. Such a reference may be realized, for example, by means of a pointer. Given that there is no general optimum for the bias-variance-trade-off, the pointer can be used to fine-tune the method for a specific task, for example by only selecting a fixed number of negated sentences for every original sentence or by (randomly) substituting a fraction of original sentence by their negated counterparts.

In a preferred embodiment an antonym of a negatable word is determined by comparing a context of a negatable word to one or more known contexts of synsets of the negatable word stored in a synset database to determine a similarity measure, selecting a synset based on the determined similarity to the context of the negatable word and selecting an antonym for the negatable element based on the selected synset from a database with antonyms.

As previously indicated, in order to obtain meaningful antonyms and exclude antonyms that are meaningless, i.e., consider only antonyms that are relevant for the specific meaning or current context of a negatable word, the context of a negatable word is compared to the context of synsets of the negatable word stored in a synset database. A synset is a set of cognitive synonyms. In other words, a synset is a set of one or more synonyms that are interchangeable in some context without changing the truth value of the proposition in which they are embedded. Since words frequently have different meanings in different context, a word may have multiple synsets, each with a different context. For example, the word "intelligence" may on the one hand refer to a report of recent events or facts not previously known and on the other hand to the ability to learn and understand. The correct interpretation can only be derived from the context in which the word is used.

In order to determine the correct synset, a similarity measure for the context of the negatable word and the contexts of the one or more synsets is determined. The context may, for example, be the original selected sentence, a shortened sentence and/or additional sentences preceding or following the selected sentence in a text, A similarity measure may be constructed amongst others by counting words that appear in both the context of the negatable word and the respective contexts of the different synsets or can be calculated using a string distance function like Levenshtein distance, Jaro-Winkler distance, Hellinger distance or comparable. For complex functions like Hellinger distance it will be necessary to calculate probabilities of a word appearing in a text. This can be done e.g. with machine learning algorithms like Latent Dirichlet Allocation (LD). To calculate the distances of texts instead of single words it is well known in the art to calculate indicators like the mean or median of the word-distances which may be weighted by the number of words or similar Once a similarity measure has been determined, the synset with the greatest similarity may be chosen for selecting an antonym from a database with antonyms. The database with antonyms may be the same database as the synset database. In an exemplary embodiment it is also possible to refrain from negating a sentence if the determined similarity measures do not exceed a threshold since it may be concluded that the correct context could not be determined.

In a preferred embodiment the similarity measure is a distance between a centroid vector of the context of the negatable word for which an antonym shall be determined in a word vector space and respective centroid vectors of the contexts of the synsets for the negatable word in the same word vector space.

This preferred embodiment makes use of a word vector space or word embedding such as GloVe or word2vec. These word vector spaces are trained by positioning a word in the multi-dimensional vector space according to its context. Hence, words of similar context will be located closely to one another. The distance in a word vector space and, thus, also proximity is usually measured by taking the cosine of two vectors. In the present embodiment, the word vector for the words of the context of the negatable word are retrieved from the word vector space and averaged in order to obtain a centroid vector. In the same manner centroid vectors are determined for the respective contexts of the synsets of the negatable word. As the skilled person is aware, other mathematical operations like taking the least minimal distance between different sets of vectors could be uses instead of centroid-vector comparison Based on the centroid vectors a distance between the centroid vector of the context of the negatable element and the centroid vectors of the contexts of the synsets is determined as a similarity measure where a smaller distance indicates a closer proximity or higher similarity of the respective synsets. Using a distance between the centroid vectors is a computationally efficient method of determining the similarity of two or more contexts.

In a further preferred embodiment an antonym of a negatable word is determined in a word vector space by determining a position of the negatable word in the word vector space, adding a predetermined antonym vector to the position of the negatable word in the word vector space to obtain a modified vector pointing towards an antonym in the word vector space and selecting the antonym among words that are in the vicinity of the modified vector, wherein the predetermined antonym vector is an average of antonym vectors determined based on a list of a plurality of pairs of a word and a known antonym of the word, wherein for each pair the antonym vector is a vector pointing from the word to the known antonym of the word in the word vector space.

In other words, in this exemplary embodiment it may not be necessary to rely on the surrounding words of a negatable word. Instead, a position of the word in given multi-dimensional word vector space is determined in which words are arranged according to their context. For the same word vector space an average antonym vector has previously been determined which is referred to as the predetermined antonym vector. The predetermined antonym vector is calculated based on a set of known pairs of antonyms. For each of these antonyms an antonym vector is determined pointing from one element of an antonym pair to the other. The antonym vectors for all antonym pairs in the set of known antonyms are averaged to obtain the predetermined antonym vector. When this vector is added to given negatable word, the resulting vector points to an antonym of the word. The preferred embodiment allows for a computationally efficient and time-saving determination of a antonyms as each antonym can be determined by a mere vector addition.

In a second aspect the invention relates a computer-implemented method of training a word embedding or an NLP or NLU machine learning algorithm based on a training dataset prepared according to any of the preceding embodiments. The advantages of the method correspond to the advantages previously discusses In particular, the training or determination of statistical patterns is particularly computationally efficient as due to the augmentation with negated sentences the training dataset covers a broad range of statements which would otherwise only be found in significantly larger training datasets.

In a third aspect the invention relates to the use of a word embedding trained according to the preceding embodiment in an NLP or NLU machine learning algorithm. Due to the use of augmentation of the training dataset with negated sentences, the word embedding provides richer contexts for each word. Since in the training dataset created according to any of the preceding embodiments antonyms appear in the same context, they move closely together in a word vector space. This allows for a broader understanding of closely related topics with opposing statements.

In a fourth aspect the problem underlying the present invention is solved by a system comprising at least one data processing unit and at least one memory, wherein the system is configured to perform a method according to any of the preceding embodiments. The system could, for example, be configured to perform previously described methods for creating a training dataset, training a word embedding or an NLP or NUJ machine learning algorithm, or using a word embedding trained according to the preceding embodiment in a machine learning algorithm. The advantages of the system correspond to the method performed by the system.

In a fifth invention related to a computer program product that when loaded in the memory of a system and executed on at least one data processing unit included in the system configures the system to perform a method according to any of the preceding embodiments. The computer program product could, for example, configure the system to perform previously described methods for creating a training dataset, training a word embedding or an NLP or NLU machine learning algorithm, or using a word embedding trained according to the preceding embodiment in a machine learning algorithm. The advantages of the system correspond to the method performed by the system when configured by the computer program product.

In the following the present invention will be described in more detail with reference to the exemplary embodiments shown in the drawings, wherein FIG. 1 shows a flow chart of an exemplary embodiment of a method for creating a training dataset.

Figure 1:
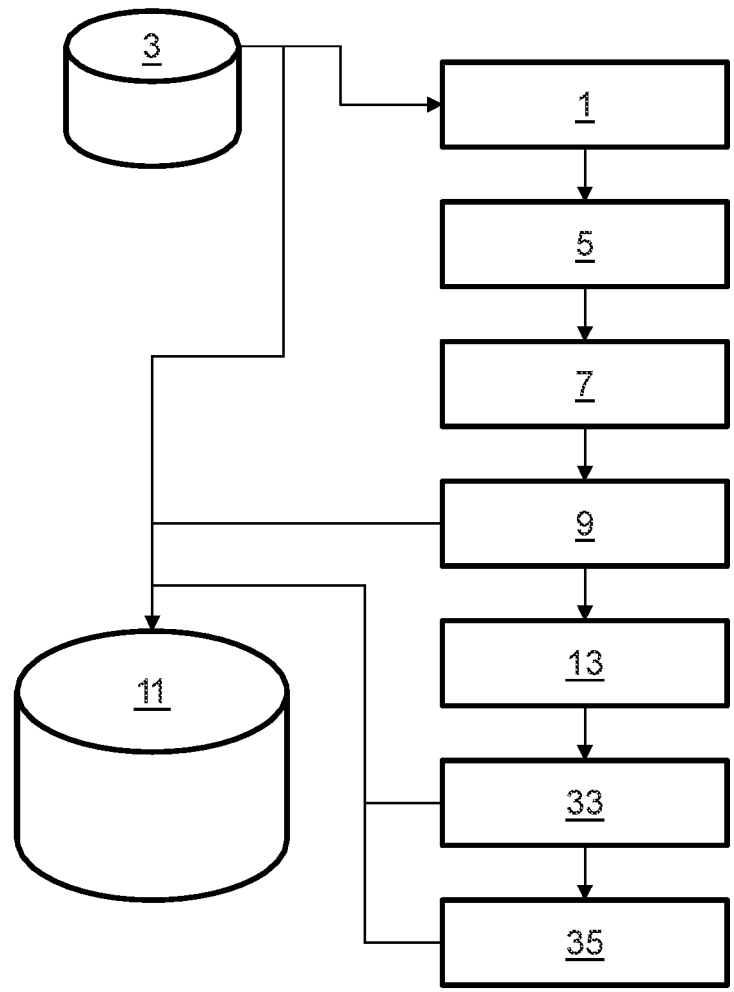

FIG. 1 shows a flow chart depicting an exemplary embodiment of a method for creating a training dataset from an original text dataset. In a first step 1 a sentence is selected from a database 3 storing the original text dataset. The original text dataset may have been derived from an existing text corpus and may have been pre-processed in various ways that are known to the person skilled in the art. In particular, the pre-processing will have included sentence tokenization so that individual sentences can be selected from the database 3. A sentence selected form the original text dataset is in the following referred to as a selected sentence.

In a second step 5 the selected sentence may undergo additional pre-processing such as, for example, word tokenization, POS-tagging, noun-chunk parsing or dependency parsing. The method may to this end rely on additional resources not depicted in FIG. 1. In the exemplary embodiment shown in FIG. 1 at least POS-tagging and noun-chunk parsing are performed to ease the following method steps. Further, the pre-processing includes determining basic grammatical elements in the selected sentence such as, for example, the subject, object and predicate of the selected sentence. Note that the subject, object and predicate may identify a single word but preferably identifies chunks of words forming the respective grammatical element. For example, an object or a subject may include a noun, an adjective and a preposition and a predicate may comprise a verb and an adverb.

In the third step 7 grammatical elements of the selected sentence are determined based on the pre-processing in the second step 5. The determined grammatical elements at least include an object, a predicate and a subject of the selected sentence. Among these grammatical elements those are selected that can and shall be negated. These elements will going forward be referred to as negatable element. A negatable element may comprise one word but could also encompass multiple words. In the latter case a negatable element may be negated in different ways by negating different individual negatable words of the negatable element or even more than one negatable word of the same negatable element.

In a fourth step 9 which may also be part of the second step a shortened sentence is formed from the selected sentence by combining the previously determined subject, object and predicate from the selected sentence. The shortened sentence is stored in a second database 11 as part of the training dataset which shall be created. This training dataset also encompasses the original text dataset stored in database 3. While being shown as different logical entities in FIG. 1, the first and second database 3, 11 may be stored in the same memory and may be the same database in which both the training dataset and the original text dataset are stored.

Creating shortened sentences has several advantages. On the one hand, it enables a machine learning algorithm trained on the training dataset to more rapidly determine basic patterns involving subject, predicate and object as more complicated sentence structures are eliminated. Thus, the time but also the computational resources required for analyzing a selected sentence are reduced as less words have to be analyzed to determine the same pattern. Further, basic patterns such as subject, predicate and object patterns are emphasized over more complex patterns present in the selected sentences which may also improve the quality of the statistical patterns derived from the training dataset. Further, operating on shortened sentences also reduces the timing and computational requirements in the following method steps as, in particular, the effort required to determine the correct antonym of a negatable element is reduced due to the less extensive context. Finally, without shortening the sentences the number of possible negations (of words in secondary noun-chunks not related to a subject-predicate-object-triple) might be so high that positive effects on computational time are outbalanced by increasing the total number of sentences too much.

In a fifth step 13 antonyms are determined for one or more negatable words in each negatable element, Two different ways of finding antonyms for a negatable word will now be described with reference to FIGS. 2 and 3, respectively.

Figure 2:
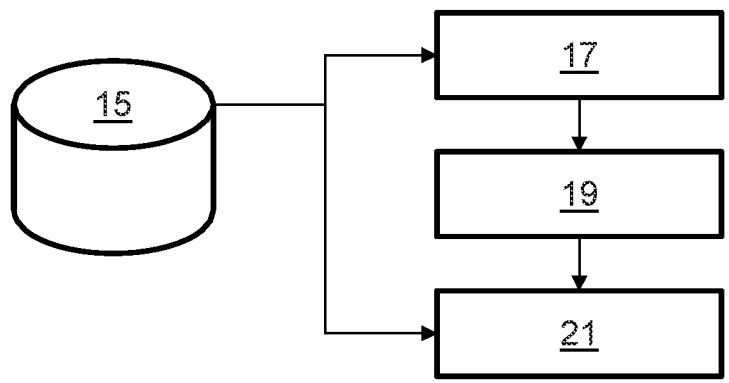
FIG. 2 shows a flow chart of an exemplary embodiment of method of determining an antonym of a word.

A first method of obtaining one or more antonyms for a negatable word, i.e., a word that shall be negated, is shown in FIG. 2. The method relies on a database 15 which includes for each word one or more synsets. In a first step 17 of this method the synsets available for a negatable word are retrieved from the database 15. In a second step 19 of this method a similarity measure between the synsets and the context of the negatable word is determined. Here, the context is formed from the shortened sentence from which the negatable word was taken. However, it is also possible to take the original selected sentence as context or even additional sentences that precede or follow the selected sentence.

In the exemplary embodiment the similarity measure is determined using a word vector space in which the synsets of the negatable word as well as the context are mapped. For each word in the context of the negatable word as well as for each word of the definition of the synset the corresponding vector is determined. In an averaging operation centroid vector are determined for the synsets definitions and the context of the negatable word, respectively. As a similarity measure a cosine distance between the centroid vector of the context on the one hand and the centroid vectors of each of the synsets definitions on the other hand is determined.

The synset with the smallest cosine distance to the context is selected as representing the context of the negatable word. In case the cosine distance exceeds a predetermined threshold, it is concluded that none of the synsets matches the current context and no antonym is determined for the currently considered negatable word. Finally, in the third step 21 of the present method one or more antonyms are selected from the database 15 based on the closest synset.

Figure 3:
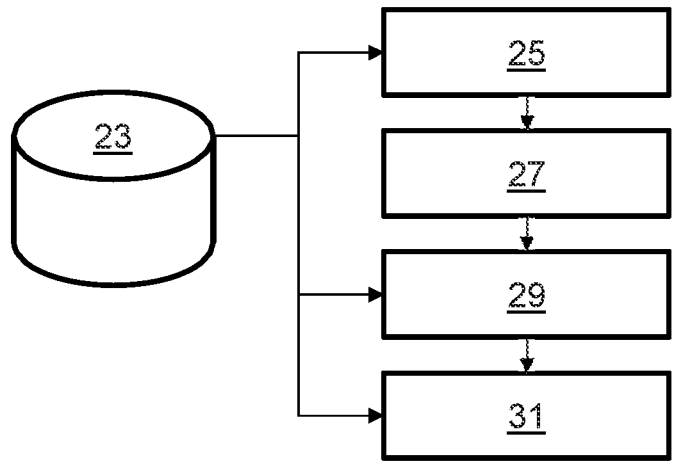
FIG. 3 shows a flow chart of another exemplary embodiment of method of determining an antonym of a word.

Alternatively, one or more antonyms may be selected for a negatable word using the method shown in FIG. 3. The method relies on a database 23 which includes a word vector space from which the antonyms shall be taken.

The method includes in a first step 25 determining for pairs of words which are known to be antonyms to one another the respective coordinates in the word vector space and calculating a vector pointing from one word to the other in the word vector space. In a second step 27 the vectors determined for all pairs in the list are averaged to obtain an average antonym vector which will be referred to as the predetermined antonym vector. The first and second step 25, 27 do not have to be repeated every time the method is executed. In fact, they may be carried out once in advance, for example, when the word vector space stored in the database 23 is created. The predetermined antonym vector may, for example, also be stored in the database. Afterwards, whenever the method is used to determine an antonym the predetermined antonym vector can be reused to find an antonym for a negatable word.

In the third step 29 of the present method to determine an antonym, the negatable word which shall be negated is located in the word vector space stored in the database 23 and the predetermined antonym vector is added to its location. The resulting modified vector now points towards the position of an antonym of the negatable word. In a final step 31 one or more words which are closest in terms of a cosine distance to the modified vector are selected as antonyms of the negatable word. If no word is located within a predetermined distance, the method may conclude that the word vector space does not include an antonym for the current negatable word.

Once one or more antonyms have been determined with either the method shown in FIG. 2 or the method shown in FIG. 3, the method for creating a training dataset resumes in at the sixth step 33 in which the actual negated sentences are created from the shortened sentences which serve as selected sentences in the present embodiments. The negated sentences are created by replacing the negatable words with their respective antonyms, in the exemplary embodiment shown in FIG. 1, one negatable sentence is created for each determined antonym by replacing the negatable word for which the antonym was selected and storing the negated sentence in the training dataset 11. Further, additional negated sentences are created by replacing more than one negatable word with a respective antonym in a selected sentence. However, preferably only an uneven number of negatable words is replaced in a selected sentence every time to prevent double negations. Also, the additional negated sentences are stored in the training dataset located in the database 11.

In a final step the created short negated sentences are transformed to complete sentences by adding the differences between the selected sentence and its corresponding shortened sentence to the short negated sentence. These long negated sentences are also stored in the training dataset to further augment the training dataset.

The exemplary embodiment thus provides a preferred way of augmenting an original text dataset with additional information and, in particular, allows removing a bias otherwise present in the dataset by adding statements to the training dataset that cannot be found in the original training dataset. As the size of the training dataset nevertheless remains small compared to a dataset with a similar broad variety of statements allocated from non-augmented datasets, and NLU machine learning methods and word embeddings can be trained very efficiently using the training dataset. In particular, the timing required to train the machine learning method and the computational resources required will be less compared to achieving the same quality in a machine learning method trained with non-augmented datasets.

Figure 4:
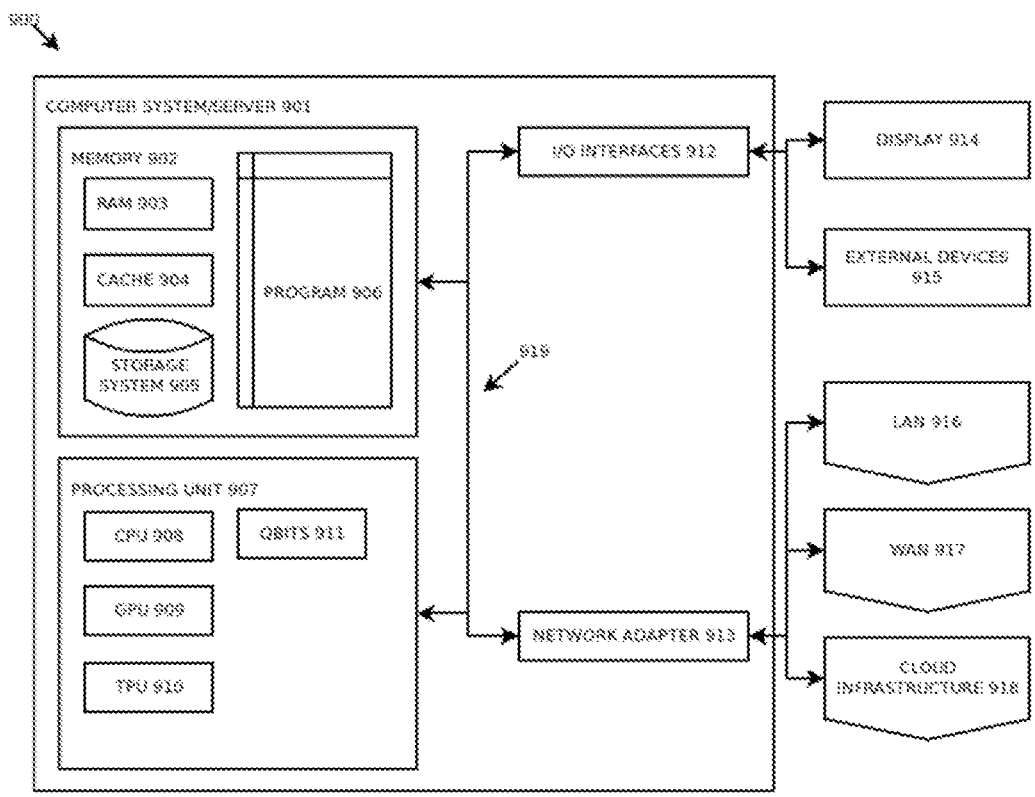
FIG. 4 shows a schematic diagram of a system for implementing a method for creating a training dataset or a method of training an NLP or NLU machine learning method using a training dataset.

FIG. 4 shows an exemplary embodiment of system 901 in the form of a general-purpose computing device which can be used to implement the method described with reference to FIGS. 1 to 3. The system 901 includes but is not limited to a system memory 902, one or more processing units 907, an I/O interface 912, a network adapter 913, and a bus 919 coupling various system components including system memory 902 to the one or more processing units 907.

Bus 919 can be of any kind of bus structures such as a memory bus, peripheral bus, graphics port and processor bus or local bus using any of a variety of bus architectures including Micro Channel Architecture bus MCA, Industrie Standard Architecture bus ISA, Enhanced. Industry Standard Architecture bus EISA, Video Electronics Standards Association local bus VESA, and Peripheral Component Interconnects bus PCI.

System memory 902 can be in the form of volatile memory, like random access memory RAM, 903 as well as cache memory 904. The system 901 may include in addition storage media 905 that can be in the form of magnetic storage or solid state storage in form of a hard disk, memory card or optical disk such as CD-ROM, or DVD-ROM. If included, these storage system media 905 can be connected to bus 919. System memory 902 also includes at least one computer program product 906 that when executed by at least one of the processing units 907 of the system 901 configure the system 901 to execute one of the previously described exemplary embodiments of a method for creating a training dataset, a method for training a NIP or NLU machine learning algorithm or a word embedding, or a method of running a machine learning algorithm using a corresponding word embedding.

The system 901 contains one or more processing units 907. The one or more processing units 907 may also collectively referred to as the processor 907 of the system 901. The processor 907 is connected to the other parts of the system 901 via bus 919 and may include different types of processing unit hardware. For example, the processor 907 may include a central processing unit (CPU) 908, graphical processing unit (GPU) 909, tensor processing unit (TPU) 910 or processing units for quantum computing (QBITS) 911.

System 901 may also be connected via the I/O interface 912 to one or more displays 914 and other external devices 915 like keyboard, mouse, pointer, speaker etc. The system 901 may also include a network adapter 913 enabling communication with other computers in local area networks (LAN) 916, wide area networks (WAN) 917 or cloud infrastructures 918. The network adapter 913 communicates with the other components of the system 901 via bus 919. The tasks of communication over the network adapter may include but are not limited to data storage e.g. in a RAID-system, push and pull requests on automated programming interfaces (APIs), remote access for users etc.

System 901 can also be a distributed system where different aspects of the previously described methods are implemented in different systems 901 which may be in different locations.

The computer program product 906 may include computer readable program instructions causing a processor 907 to carry out aspects of the previously described methods. The computer program product may be stored in a computer readable storage medium such as a hard drive, CD-ROM, DVD-ROM or a flash memory. However, the computer program product could also be provided in form of a download from a computer readable storage medium or to an external computer or external storage device via a network, for example the Internet, a LAN, or another WAN.

Example Machine Architecture and Machine-Readable Medium

Figure 5:
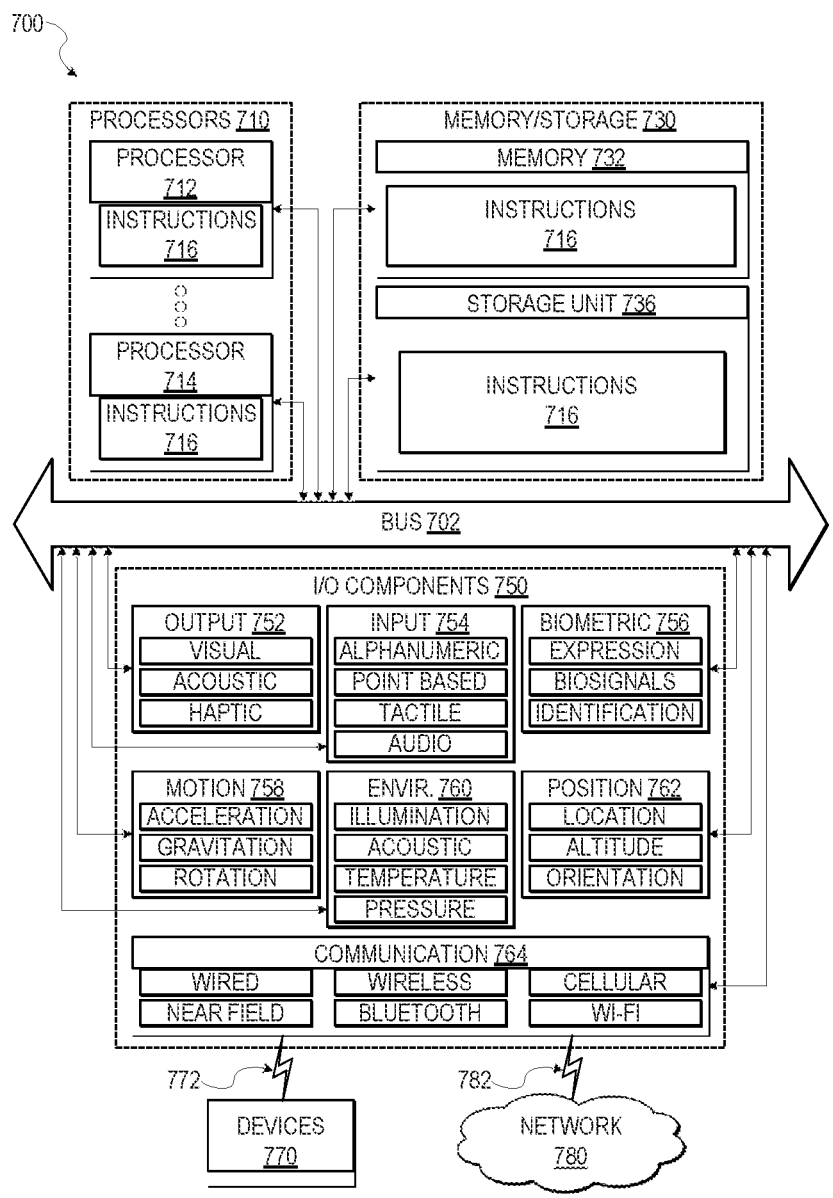
FIG. 5 shows a block diagram illustrating components of a machine, according to some example embodiments, able to read instructions from a machine-readable medium (e.g., a machine-readable storage medium) and perform any one or more of the methodologies discussed herein.

FIG. 5 is a block diagram illustrating components of a machine 700, according to some example embodiments, able to read instructions from a machine-readable medium (e.g., a machine-readable storage medium) and perform any one or more of the methodologies discussed herein. Specifically, FIG. 5 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. The instructions may implement one or more of the devices and/or components of FIGS. 1-4. The instructions transform the general, non-programmed machine into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a personal digital assistant (PDA), or any machine capable of executing the instructions 716, sequentially or otherwise, that specify actions to be taken by machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 712 and processor 714 that may execute instructions 716. The term "processor" is intended to include multi-core processor that may comprise two or more independent processors (sometimes referred to as "cores") that may execute instructions contemporaneously. Although FIG. 5 shows multiple processors, the machine 700 may include a single processor with a single core, a single processor with multiple cores (e.g., a multi-core process), multiple processors with a single core, multiple processors with multiples cores, or any combination thereof.

The memory/storage 730 may include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 may also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of processors 710 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 5. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762 among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safely or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via coupling 782 and coupling 772 respectively. For example, the communication components 764 may include a network interface component or other suitable device to interface with the network 780. In further examples, communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a Universal Serial Bus (USB)).

Moreover, the communication components 764 may detect identifiers or include components operable to detect identifiers. For example, the communication components 764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data. Matrix, Dataglyph, MaxiCode, PDF/413, Ultra Code, UCC RSS-2D bar code, and other optical codes), or acoustic detection components (e.g., microphones to identify tagged audio signals). In addition, a variety of information may be derived via the communication components 764, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 780 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or other type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to devices 770. The term "transmission medium" shall be taken to include any intangible medium that is capable of storing, encoding, or carrying instructions 716 for execution by the machine 700, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A computer-implemented method comprising:
    selecting, by one or more processors, one or more sentences from an original text dataset as one or more selected sentences;
    determining, by the one or more processors, for each selected sentence one or more grammatical elements of the selected sentence that can be negated as one or more negatable elements;
    determining, by the one or more processors, for one or more negatable words in each negatable element one or more antonyms;
    based on each determined antonym, creating, by the one or more processors, a negated sentence by replacing the respective negatable word in the selected sentence for which the antonym was determined with the determined antonym; and
    adding, by the one or more processors, the negated sentence to a training dataset, the training dataset configured to be used in a natural language processing (NLP) machine learning algorithm.

2. The computer-implemented method according to claim 1, further comprising:
    creating additional negated sentences for at least one determined antonym of the one or more determined antonyms by replacing the respective negatable word in the selected sentence for which the antonym was determined with the determined antonym and further replacing at least one other negatable word in a negatable element of the selected sentence with an antonym determined for the at least one other negatable word in a negatable element; and
    adding the additional negated sentences to the training dataset,
    wherein each additional negated sentence is formed from a selected sentence by replacing in total an uneven number of negatable words by antonyms in the selected sentence.

3. The computer-implemented method according to claim 1, wherein determining for each selected sentence one or more grammatical elements includes determining at least a subject, an object and a predicate of the selected sentence as grammatical elements of the selected sentence, wherein at least one of the object and the predicate of the selected sentence are determined as a negatable element.

4. The computer-implemented method according to claim 3, comprising forming for each selected sentence a shortened sentence by combining the subject, object and predicate previously determined for the selected sentence, wherein the shortened sentence is added to the training dataset.

5. The computer-implemented method according to claim 4, wherein the shortened sentence of a selected sentence is used as context for determining the one or more antonyms of the one or more negatable elements of the selected sentence.

6. The computer-implemented method according to claim 4, wherein the shortened sentence is used as the selected sentence for creating the negated sentence.

7. The computer-implemented method according to claim 6, wherein additional negated sentences are created for each selected sentence by taking a difference between a selected sentence and the shortened sentence formed for the selected sentence and adding the difference to the negated sentence created when using the shortened sentence for creating additional negated sentences.

8. The computer-implemented method according to claim 1, wherein the original text dataset is included into the training dataset, and
    wherein the training dataset includes for each negated sentence a reference to the respective selected sentence from which the negated sentence was created.

9. The computer-implemented method according to claim 1, wherein an antonym of a negatable word is determined by comparing a context of the negatable word to contexts of one or more known synsets for the negatable word stored in a synset database to determine a similarity measure, selecting a synset based on the determined similarity measure and selecting an antonym for the negatable word based on the selected synset from a database with antonyms,
  wherein the similarity measure is a distance between a centroid vector of the context of the negatable word for which an antonym is determined in a word vector space and respective centroid vectors of the contexts of the one or more known synsets for the negatable word in a same word vector space.

10. The computer-implemented method according to claim 1, wherein an antonym of a negatable word in a negatable element is determined in a word vector space by:
  determining a position of the negatable word in the word vector space;
  adding a predetermined antonym vector to the position of the negatable word in the word vector space to obtain a modified vector pointing towards an antonym in the word vector space; and
  selecting the antonym among words that are in a vicinity of the modified vector,
  wherein the predetermined antonym vector is an average of antonym vectors determined based on a list of a plurality of pairs of a word and a known antonym of the word, wherein for each pair the antonym vector is a vector pointing from the word to the known antonym of the word in the word vector space.

11. The computer-implemented method of claim 1, further comprising training a word embedding or an NLP machine learning algorithm based on the training dataset.

12. The computer-implemented method of claim 11, further comprising using the word embedding in an NLP machine learning algorithm.

13. A system comprising at least one processor and at least one memory in communication with the at least one processor, wherein the at least one memory comprises instructions thereon that, when executed by the at least one processor, causes the at least one processor to:
  select one or more sentences from an original text dataset as one or more selected sentences;
  determine for each selected sentence one or more grammatical elements of the selected sentence that can be negated as one or more negatable elements;
  determine for one or more negatable words in each negatable element one or more antonyms;
  based on each determined antonym create a negated sentence by replacing the respective negatable word in the selected sentence for which the antonym was determined with the determined antonym; and
  add the negated sentence to a training dataset, the training dataset configured to be used in a natural language processing (NLP) machine learning algorithm.

14. The system of claim 13, wherein the one or more grammatical elements include a subject, an object and a predicate of the selected sentence.

15. The system of claim 14, wherein at least one of the object and the predicate of the selected sentence are determined as a negatable element.

16. The system of claim 14, wherein the instructions further cause the at least one processor to form for each selected sentence a shortened sentence by combining the subject, object and predicate, wherein the shortened sentence is added to the training dataset.

17. The system of claim 16, wherein the shortened sentence of a selected sentence is used as context for determining the one or more antonyms of the one or more negatable elements of the selected sentence.

18. The system of claim 16, wherein the shortened sentence is used as the selected sentence for creating the negated sentence.

19. A non-transitory computer-readable storage medium including instructions that when executed by one or more processors, cause the one or more processors to:
  select one or more sentences from an original text dataset as one or more selected sentences;
  determine for each selected sentence one or more grammatical elements of the selected sentence that can be negated as one or more negatable elements;
  determine for one or more negatable words in each negatable element one or more antonyms;
  based on each determined antonym create a negated sentence by replacing the respective negatable word in the selected sentence for which the antonym was determined with the determined antonym; and
  add the negated sentence to a training dataset, the training dataset configured to be used in a natural language processing (NLP) machine learning algorithm.

20. The non-transitory computer-readable storage medium of claim 19, wherein the instructions further cause the one or more processors to:
  create additional negated sentences for at least one determined antonym of the one or more determined antonyms by replacing the respective negatable word in the selected sentence for which the antonym was determined with the determined antonym and further replacing at least one other negatable word in a negatable element of the selected sentence with an antonym determined for the at least one other negatable word in a negatable element; and
  add the additional negated sentences to the training dataset,
  wherein each additional negated sentence is formed from a selected sentence by replacing in total an uneven number of negatable words by antonyms in the selected sentence.

* * * * *